United States Patent
Schwalb (10) Patent No.: US 7,512,955 B2
(45) Date of Patent: Mar. 31, 2009

(54) METHOD AND SYSTEM FOR ACCESSING AND IMPLEMENTING DECLARATIVE APPLICATIONS USED WITHIN DIGITAL MULTI-MEDIA BROADCAST

(75) Inventor: Eddie M. Schwalb, Irvine, CA (US)

(73) Assignee: Sharp Laboratories of America, Inc., Camus, WA (US)

( * ) Notice: Subject to any disclaimer, the term of this patent is extended or adjusted under 35 U.S.C. 154(b) by 1828 days.

(21) Appl. No.: 09/924,136

(22) Filed: Aug. 7, 2001

(65) Prior Publication Data

US 2003/0033607 A1    Feb. 13, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................... 719/328; 717/117
(58) Field of Classification Search ............ 719/311, 719/328; 717/117
See application file for complete search history.

(56) References Cited

U.S. PATENT DOCUMENTS

| | | | | |
|---|---|---|---|---|
| 5,982,445 | A | * 11/1999 | Eyer et al. | 348/461 |
| 5,996,015 | A | 11/1999 | Day et al. | 709/226 |
| 6,029,175 | A | 2/2000 | Chow et al. | 707/104 |
| 6,041,400 | A | 3/2000 | Ozcelik et al. | 712/35 |
| 6,115,080 | A | 9/2000 | Reitmeier | 348/731 |
| 6,122,639 | A | 9/2000 | Babu et al. | 707/103 |
| 6,138,139 | A | 10/2000 | Beck et al. | 709/202 |
| 6,144,990 | A | 11/2000 | Brandt et al. | 709/203 |
| 6,145,120 | A | * 11/2000 | Highland | 717/106 |
| 6,154,766 | A | 11/2000 | Yost et al. | 709/201 |
| 6,154,772 | A | 11/2000 | Dunn et al. | 709/217 |
| 6,476,833 | B1 | * 11/2002 | Moshfeghi | 715/854 |
| 6,635,089 | B1 | * 10/2003 | Burkett et al. | 715/513 |

OTHER PUBLICATIONS

Wugofski, Ted. "A Modular Hypertext Markup Language for Broadcast Applications." Oct. 1, 1998, Draft #4, Over the Moon Productions / Gateway, <http://xml.coverpages.org/bhtml-4.html>.*
Advanced Television Systems Committee, "ATSC Data Broadcast Standard (Including Amendment 1 and Corrigendum 1 and Corrigendum 2)." Jul. 26, 2000, Doc. A/90.*
Dolan, Michael A. "Report on Television Data Applications." Jul. 1, 2001, NIST GCR 01-818.*

* cited by examiner

*Primary Examiner*—Li B Zhen
*Assistant Examiner*—Nathan Price
(74) *Attorney, Agent, or Firm*—Michael F. Krieger; Kirton & McConkie (57) ABSTRACT

A method and system are described that enable the construction of declarative applications, such as XDML, that can access DASE System services. DASE System services include among other things, channel switching and electronic program guide application within a broadcast environment established under the standards of Advanced Television System Committee (ATSC). For example, when a Program and System Information (PSI) application is stored in a Document Object Model (DOM) data structure or database, an Electronic Program Guide (EPG) application can be automatically generated using an EPG-transform method in accordance with the present invention. This method would: 1) Convert DOM structure into an XML document; 2) Apply an XML Style Sheet Transformation (XSLT) to the XML document; and 3) Render the resulting XML document using a conventional web-browser or XML renderer.

18 Claims, 9 Drawing Sheets

METHOD AND SYSTEM FOR ACCESSING AND IMPLEMENTING DECLARATIVE APPLICATIONS USED WITHIN DIGITAL MULTI-MEDIA BROADCAST

BACKGROUND OF THE INVENTION

The present invention relates generally to the ability to access program, system information and system services within the Program and System Information Protocol (PSIP) and within a DTV Application Software Environment (DASE). More particularly, the present invention relates to enabling access to data that is not contained in declarative applications utilized within the PSIP and DASE environment. More particularly, still, the present invention enables HTML pages to perform active dynamic discovery of content and services within a digital multimedia broadcast environment.

The Advanced Television System's Committee (ATSC) has developed standards for use in the broadcast and the management of digital multimedia signals used for such applications as Digital Television (DTV) and High Definition Television (HDTV). The ATSC has established standards, such as S17, also know as DTV Application Software Environment (DASE). The DASE specification explicitly calls for co-existence of both procedural and declarative applications. Procedural applications are Xlets, which are the DTV extensions of applets. Declarative applications are XDML web-pages, which are DTV extensions of XDML pages, which are used to replace HTML pages previously used in DASE applications.

Current DASE standards utilize Application Program Interfaces (API) to enable procedural applications to access Program and System Information (PSI), which are typically handled by JavaTV API wrappers, and to use system services through the ATSC API's. In particular, the ATSC standardization effort emphasizes the DASE API as a necessary component that enables broadcaster applications to run on any receiver client, regardless of the specific underlying hardware and Operating System (OS), which achieves a write-once-run-anywhere paradigm.

Recent approaches, however, use declarative applications to perform functions previously performed by procedural applications. These declarative applications are useful in that they offer low development cost and high portability. DASE API, however, does not provide declarative applications means for PSI access. As a result, current declarative applications do not enjoy the services to which procedural applications have access. For example, there is a need for an API to access PSIP virtual channel tables for the purposes of generating an Electronic Program Guide (EPG).

Accordingly, what is needed is a declarative application or construction that provides access to DASE System services not previously available in the prior art.

SUMMARY OF THE INVENTION

According to the present invention, a method and system are described that enable the construction of declarative applications, such as XDML, that can access DASE System services. DASE System services include among other things, channel switching and electronic program guide application within a broadcast environment established under the standards of Advanced Television System Committee (ATSC). For example, when a Program and System Information (PSI) application is stored in a Document Object Model (DOM) data structure or database, an Electronic Program Guide (EPG) application can be automatically generated using an EPG-transform method in accordance with the present invention. This method can: 1) Convert DOM structure into an XML document; 2) Apply an XML Style Sheet Transformation (XSLT) to the XML document; and 3) Render the resulting XML document using a conventional web-browser or XML renderer. This enables the EPG application to be generated automatically in a real-time event by the client without the need to involve programmers in the cycle. The content provider includes an XML document that is transmitted by the broadcaster and serves as the declarative program. This reduces the task of programming receiver to the task of authoring XML documents.

Furthermore, the present invention provides for method and system that enables access to data that is not contained in the declarative application. In particular, the invention enables HTML pages to perform active dynamic discovery of content and services. For example, the invention enables XML applications to determine whether a modem or a network adapter is available through a plug-in smart-card, and if the modem is present, then the web-page is accessed; otherwise, merely a static icon is presented. The invention achieves this by extending the abstract concept of API from the procedural world to the declarative world. This provides for two types of declarative API's:

1) A novel XML API Module, and

2) A JavaScript DOM access extension.

The Declarative API enables access to Program System Information Protocol (PSIP) data, including data about advanced announcement of services as well as data about signaling of services to be started immediately. This API comprises a new XDML module, which introduces new tags having semantics that enable HTML pages to perform active dynamic discovery of content and services

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF SPECIFIC EMBODIMENTS

Reference will now be made in detail to the embodiments of the invention, examples of which are illustrated in the accompanying drawings. While the invention will be described in conjunction with the specific embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. It will be obvious, however, to one of ordinary skill in the art that the present invention may be practiced without these specific details. In other instances, well known methods, procedures, and components have not been described in detail as not to unnecessarily obscure aspects of the present invention. As such, the following more detailed description of the embodiments of the system and method of the present invention, and represented in FIGS. 1 through 10, is not intended to limit the scope of the invention, as claimed, but is merely representative of specific embodiments of the invention.

The presently defined specific embodiments of the invention will be best understood by reference to the drawings, wherein like parts are designated by like numerals throughout.

The present invention provides for a method and a system to construct declarative applications that are able to access Digital TV Application Software Environment (DASE) system services. The method and the system enable access to data that is not contained in the declarative application, specifically, the method enables HTML pages to perform active dynamic discovery of content and services within a DASE system. The application of this method extends the abstract concept of Application Program Interfaces (APIs) from the procedural portion to the declarative portion. It is based upon a procedural-declarative coexistence within an XML-DOM framework. Two types of APIs 10 are introduced and illustrated in FIG. 1. The first API is an XDML API Module 12 and the second is a JavaScript DOM access extension 14.

Figure 1:
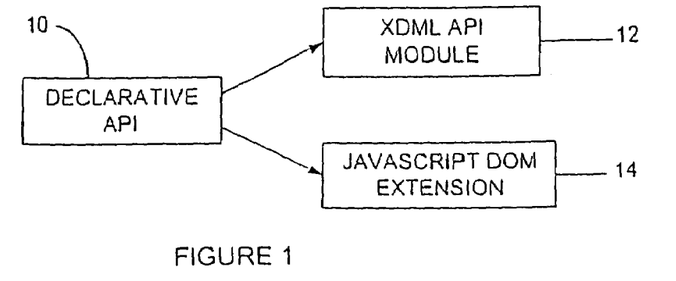
FIG. 1 illustrates a model of novel declarative APIs in accordance with the present invention.

The API 10 enables access to Program System Information Protocol (PSIP) data, which may include data about advanced announcement of services as well as data about signaling of services to be started immediately. The XDML API module 12 introduces new tags having semantics that enable HTML pages to perform active dynamic discovery of content and services as will be described in greater detail below.

Figure 2:
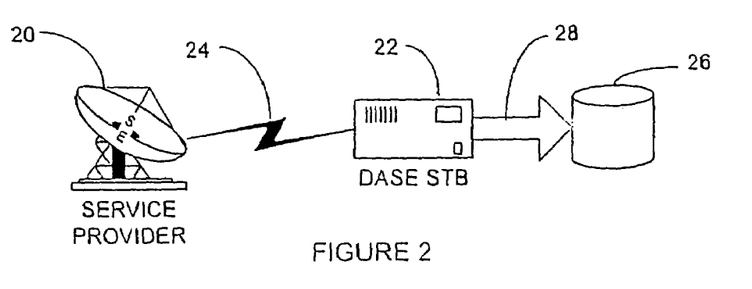
FIG. 2 illustrates a digital media transport system utilizing the declarative APIs of FIG. 1.

FIG. 2 illustrates schematic diagram of a DASE framemark in accordance with the present invention. Within the framework, a service provider 20 transmits content, in one example, in the form of a DTV transport stream 24 to a user who has a DASE rendering device, such as a DASE set-top-box (STB) 22. It should be noted that content provider 20 can be either the satellite delivery in a wireless transmission link or the cable delivery, or be a storage medium readable on a portable medium, such as compact disk, digital versatile disk, or a memory stick, for example. Rendering device or renderer 22 interprets the broadcast information received through transport stream or channel 24 and prepares it for display on a graphical user interface, such as a TV display. The DTV transport stream includes software components called DASE applications that can be run on a client broadcast rendering machine such as renderer 22. Renderer 22 accepts and realizes DASE application and, subsequently, renderer 22 collects Digital Storage Media Command and Control (DSMCC) data carried in transport stream 24 to be collected in a Program and System Information Protocol (PSIP) database 26 through a second transmission connection 28. Renderer 22 utilizes the PSIP information stored within database 26 to locate the mapping of the data channel/service locator to the corresponding physical transport stream 24 to enable renderer 22 to tune to the correct service. Renderer or STB 22 includes electronic and storage means to process and render the information in a manner consistent with both Advanced Television System Committee (ATSC) standards. These means include such elements as one or more central processing units, memory store that is both short-term, high speed, as well as long-term, large storage area elements, rendering elements to convert broadcast data stream information into useful information to be rendered on a graphical user interface, such as a TV display, for allowing both user input and control. An example of one such system is describe in detail in commonly assigned pending U.S. patent application Ser. No. 09/795,720 entitled Content Proxy Method and Apparatus for Digital Television Environment, incorporated by reference for all purposes.

Transport stream 24 also carries applications that can be supported by renderer 22 through the procedural DASE API. The broadcast applications are embedded within the transport Stream 24. These applications perform services such as customized electronic program guides, weather reports, stock market reports, television commerce, games, interactive advertixing, interactive news, interactive TV shows (e.g. play along), interactive sports broadcasts, TV-gaming, TV-auctioning, email and web-browsing, among others. In contrast, while DASE specifically requires support for declarative applications, no declarative API is defined to enable declarative applications to access the infrastructure services provided within renderer 22. These infrastructure services include, for example, remote-control events and PSIP inquiries. The present inventions overcomes this limitation by introducing a declarative API written in XDML language. It builds on the practice of mapping every XDML document to a Document Object Model (DOM) structure. Both the XDML document and the DOM structure include atomic elements. The atomic element of the XDML document is a "tag," while the atomic element of a DOM is a "node." The term "tag" and "node" can be used interchangeably when referring to the atomic component in the other language.

A novel XDML module, in accordance with the present invention, will now be described. The XDML module is an XDML API that contains a <RULE> structure having the following three elements:

1. A mandatory condition, which parallels an "if" clause;
2. A mandatory inline code to be inserted when the constraint is satisfied which parallels a "then" clause;
3. An option inline code to be inserted when the constraint is not satisfied, parallel to an "else" clause.

Rule tags may be nested to enable the implementation of "if-else" ladders.

A rule condition contains a standard Boolean expression over variables of two types:

1. Variables whose values are extracted from content, such as the PSIP tables, the current web-pages, or the state of the Xlet;
2. Variables whose values originate from user-interaction, such as remote-control operation.

The XML structure is as follows:
<Rule>
   <If> condition </IF>
   <Then> if-content </Then>
   <Else> else-content </Else>
</Rule>

The text placed between the <If> and the </If> is regarded as the condition, or the <If> node of a constraint. Its value is either true or false. The content of a tag is (1) the text between <Then> and </Then>, referred to the <Then> node of a constraint, in case the value of the <If> node is true, or (2) the text between the <Else> and </Else>, referred to the <Else> node of a constraint, and tag, in case the value of the <If> node is false.

Figure 3:
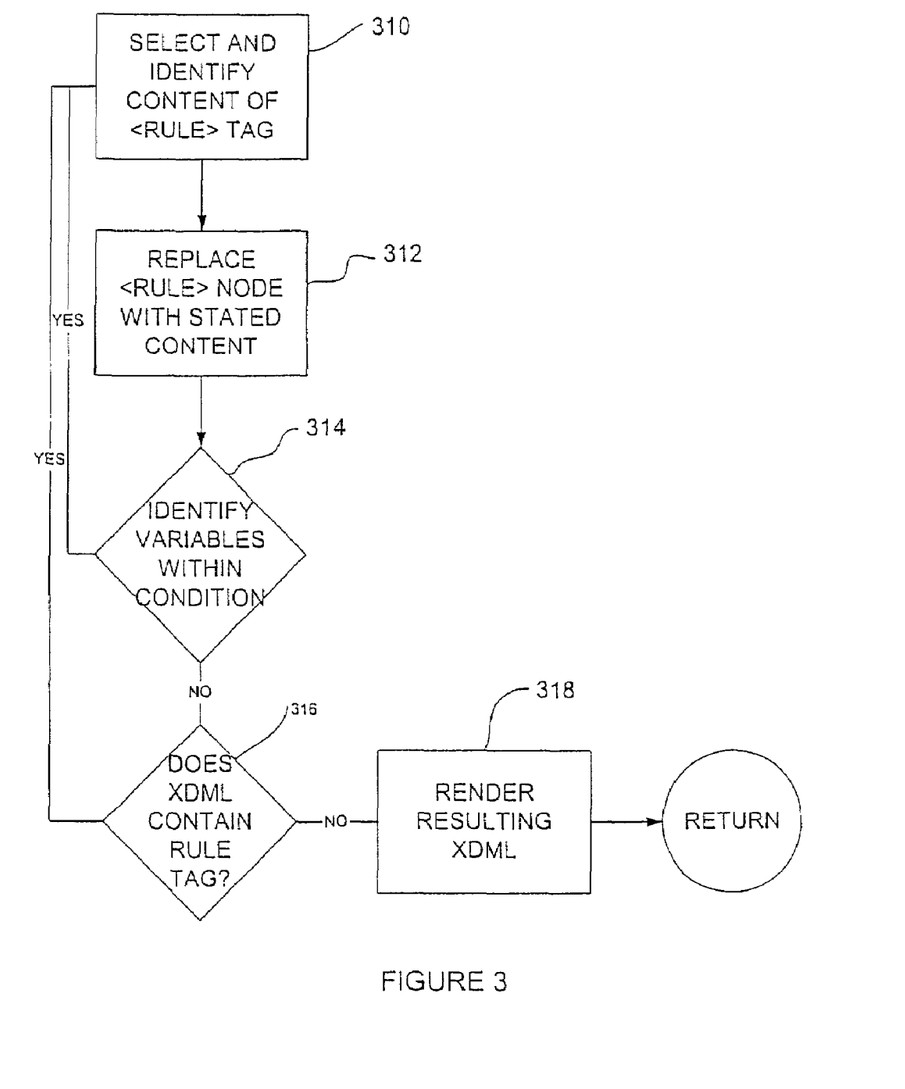
FIG. 3 illustrates a flow diagram of implementation of the XDML API in accordance with the present invention.

Renderer 22 receives the XDML API into a DTV XDML page in accordance with the following. FIG. 3 illustrates a flow diagram of how Renderer 22 renders the XDML API into a DTV XDML page. First, as shown in block 310, renderer 22 determines the content of each non-nested <Rule> tag. To do this, renderer 22 evaluates all <If> tags and decides whether the <Then> or <Else> nodes should be used. This action applies only for those cases that neither the <Then> nor the <Else> tags have nested <Rule> tags. Next, as shown in block 312, renderer 22 replaces all non-nested <Rule> nodes with their stated content. Then, as shown in block 314, render 22 determines whether these rules can be applied again, such as determining the variables in a condition that can be bound to a number of elements; if so, renderer 22 returns to block 310 and repeats the steps until all rules are exhausted. Next, in block 316, renderer 22 determines whether the resulting XDML still contains <Rules> tags and if so, returns to step 310. Once all rules are resolved through 310-316, renderer 22, as shown in block 318, renders the resulting XDML document using appropriate rendering means.

Thus, the new DTV XDML module establishes a new <Rule> tag having semantics that require every condition to be re-evaluated whenever the value of any of its variables is modified. For example, when the PSIP data is updated, all conditions containing references to the PSIP tables must be re-evaluated. In another example, when the remote-control is used to change the channel, all the constraints referencing the state of the remote-control keys must be re-evaluated.

To enable automatic re-evaluation and re-rendering of the declarative application XDML, it is possible to use dependency maps. A map is a graph having vertices and edges. A vertex is either a rule, a condition, a variable, or a PSIP data item. An edge is an arrow whose head points to an object that depends on the object pointer adjacent the pointer's tail The root of the dependency tree is always a rule object. Rules depend on conditions "if-content" and "else-content." Conditions depend on one or more variables. Conditions also depend on variables that may depend on PSIP tables. When nested rules are defined, "if-content" and "else-content" may depend on one or more rules.

Figure 4:
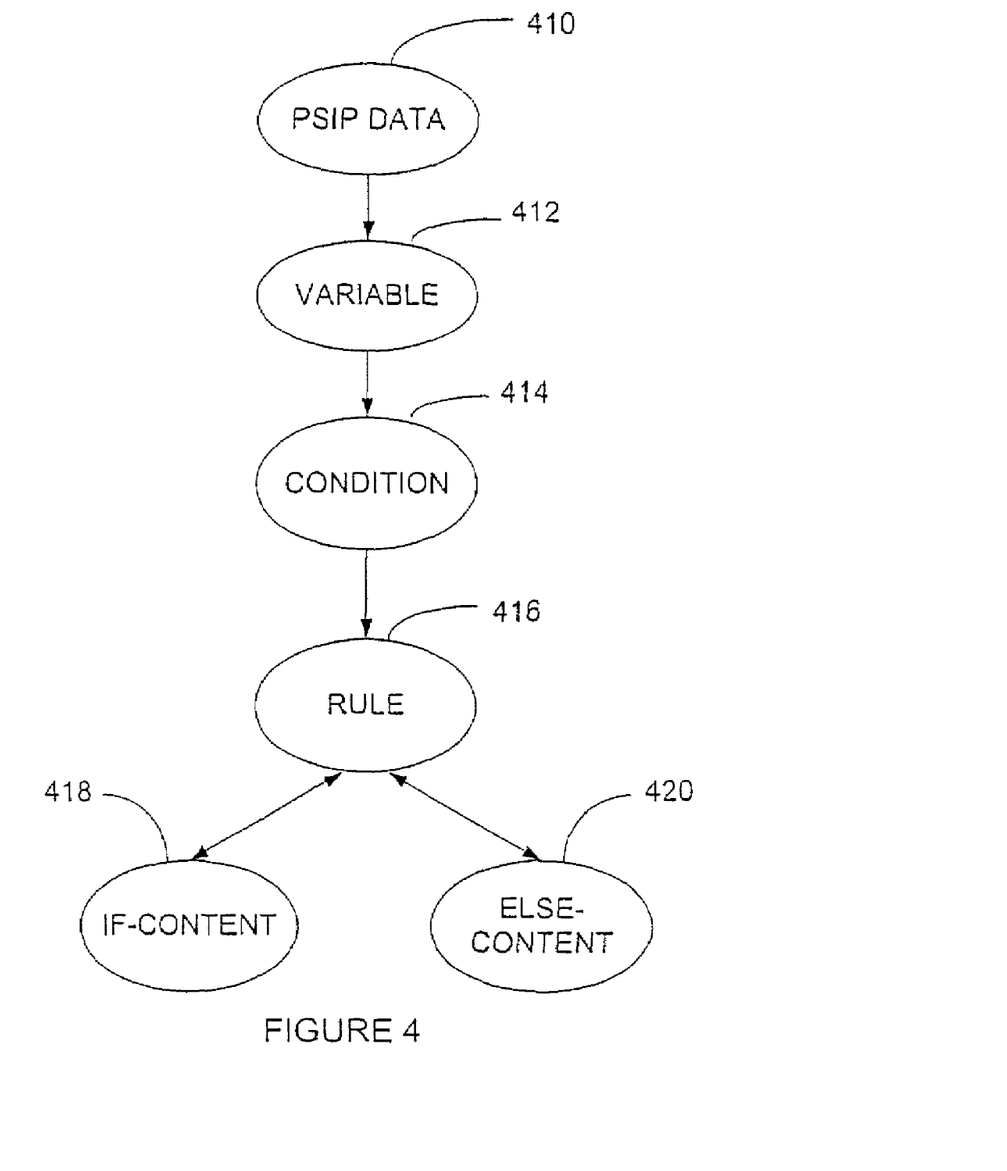
FIG. 4 illustrates the processing hierarchy and rules of the API of FIG. 3.

If utilized, the dependency graphs must comply with a given set of rules, which are shown in FIG. 4. In the example of FIG. 4 there is shown a PSIP data block 410, a variable block 412, a condition block 414, a rule block 416, "if-content" block 418, and "else-content" block 420. A condition 414 cannot directly depend on PSIP data 410. A condition 414 cannot depend directly on either "if-content" 418 or "else-content" 420. Further, rules 416 cannot directly depend on variables 412 or on PSIP data 410. Lastly, "if-content" 418 and "else-content" 420 cannot directly depend on conditions 414, variables 412, or PSIP data 410. Accordingly, renderer 22 first reviews the PSIP data 410, then analysis any variables found within the data before determining which condition 414 exists. Once variables 412 and conditions 414 have been analyzed, renderer 22 analyzes rule 416 by examining which condition, either the "if-content" 418 or "else-content" 420 or both, exist.

Figure 5:
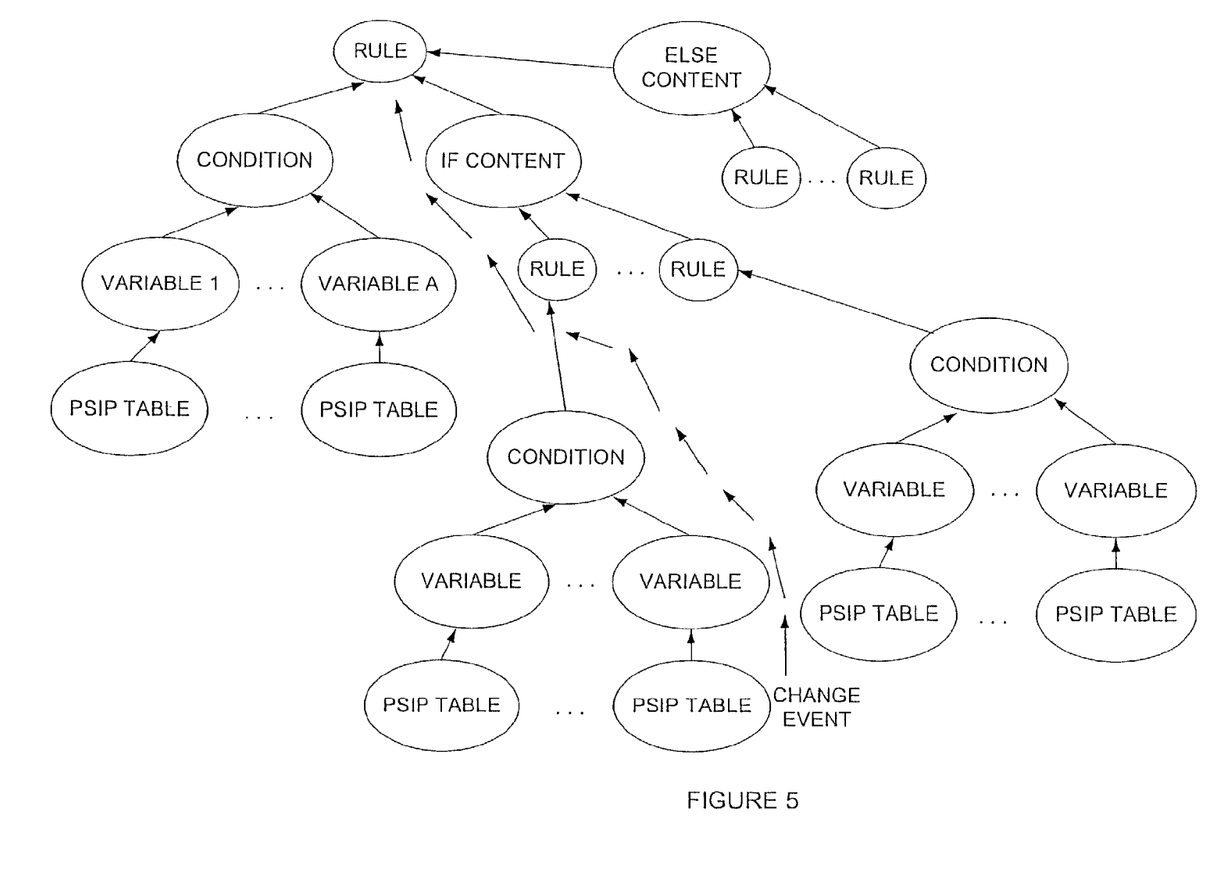
FIG. 5 depicts a dependency tree used to propagate changes according to the rules of FIG. 4.

Each tag can be given a unique identification value made possible through standard XDML facilities. The identification values enable the client side scripts to access their content. Each <Rule> tag, and its dependent tree, enables a declarative XDML application to access and discover the content of the PSIP tables. This provides a functionality that parallels the capability of the procedural JavaTV API; however, it does not directly enable JavaScript to perform such functionality. FIG. 5 illustrates a dependency tree in accordance with the present invention. Much of the PSIP data tables, variables, conditions, rules, and "if-content" and "else-content" tags as shown on FIG. 4 are also represented in the dependency tree shown in FIG. 5. The dependency tree is used to propagate changes. An object at the head of the arrow depends on an object at the base of the arrow. Rules depend on conditions, which depend on variables, which depend on PSIP tables. Change propagation is performed from the leaves to the root of the tree; this propagation can utilize events such as DOM 2 Event API.

To enable JavaScript access to the PSIP data, the present invention introduces the requirement of the following DOM semantics. The DOM of the XDML, must contain, for each <Rule> </Rule> tag a Node, having at least two children. The first Node is for the <Condition> </Condition> tag, and the second Node is for either the <If> </If> or the <Else> </Else>, or both. The content of a rule, as evaluated according to the procedure of FIG. 3, can be queried using the value attribute. For example, if the rule tag is <Rule Name=test>, then JavaScript access is given by the identified document.test.value. The content referred to by this identifier is automatically and dynamically updated whenever a ChangeEvent is propagated to the root of the dependency tree, which is shown by way of example in the dependency tree of FIG. 5.

Figure 6:
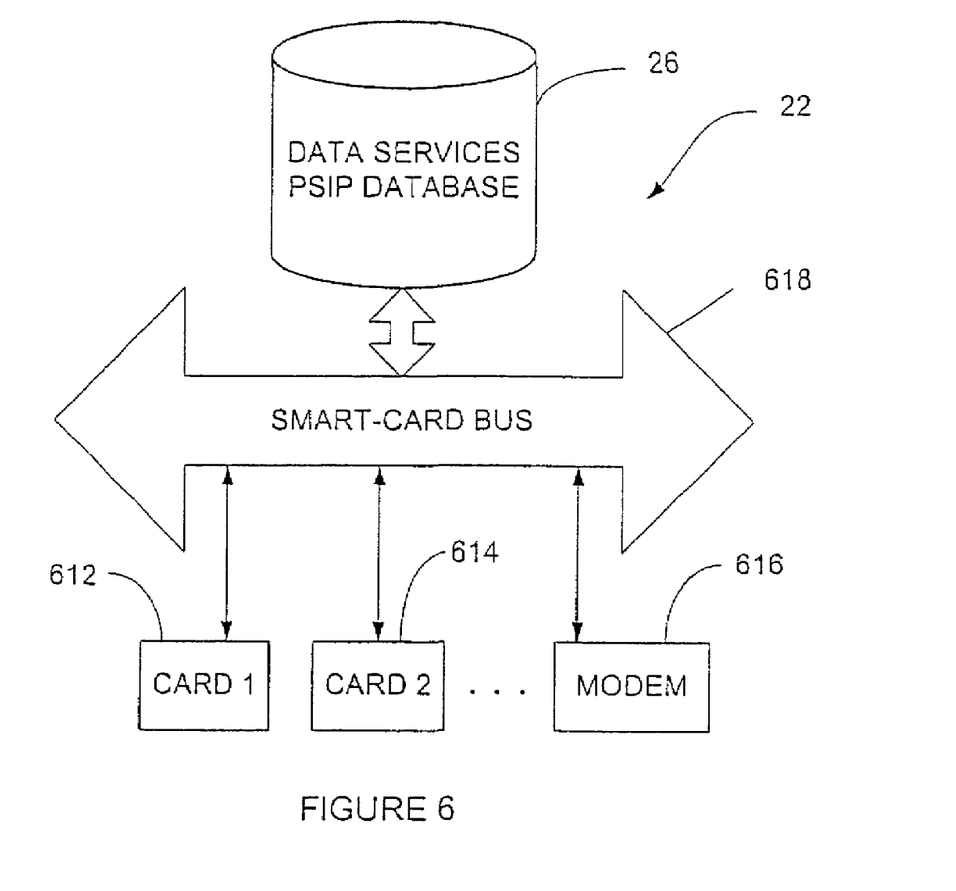
FIG. 6 illustrates a schematic diagram of a DASE system accessing a PSIP database in accordance with the present invention.

An example implementing the procedure will now be given. FIG. 6 illustrates a DASE renderer 22, such as that found in FIG. 2. Renderer 22 operates as a DASE receiver and can be equipped with multiple smart cards. In the example of FIG. 6, a plurality of smart cards 612, 614 are disclosed and one smart card may be a modem 616. Each smart card is then connected to a smart card bus 618, which enables renderer 22 to treat the PSIP database 26 as another module or smart card on bus 618. This enables aggregating, in a single PSIP database 26, the information about the services available by all smart cards 612-616, including any such cards that may have a modem or a network card. Since declarative applications are enabled to directly access each PSIP database 26 (in the case of a plurality of such databases), the declarative applications can then automatically locate or discover a modem or network connection were necessary, and utilize this connection in an appropriate manner.

For example, it is now possible, in accordance with the present invention, to describe a rule whose condition is satisfied only when a modem is detected in the PSIP database.

The "if" condition of the rule contains references to a specific Internet address, which would indicate that modem access is required in order to locate the specific internet address. In contrast, the "else" condition of the rule contains a reference to an icon available in local memory, rather than a web-page available on the Internet. Upon evaluation of the rule, the condition is tested dynamically, and if the modem is present, then the web-page is accessed; otherwise, the static icon is presented by accessing the icon found in local memory.

Figure 7:
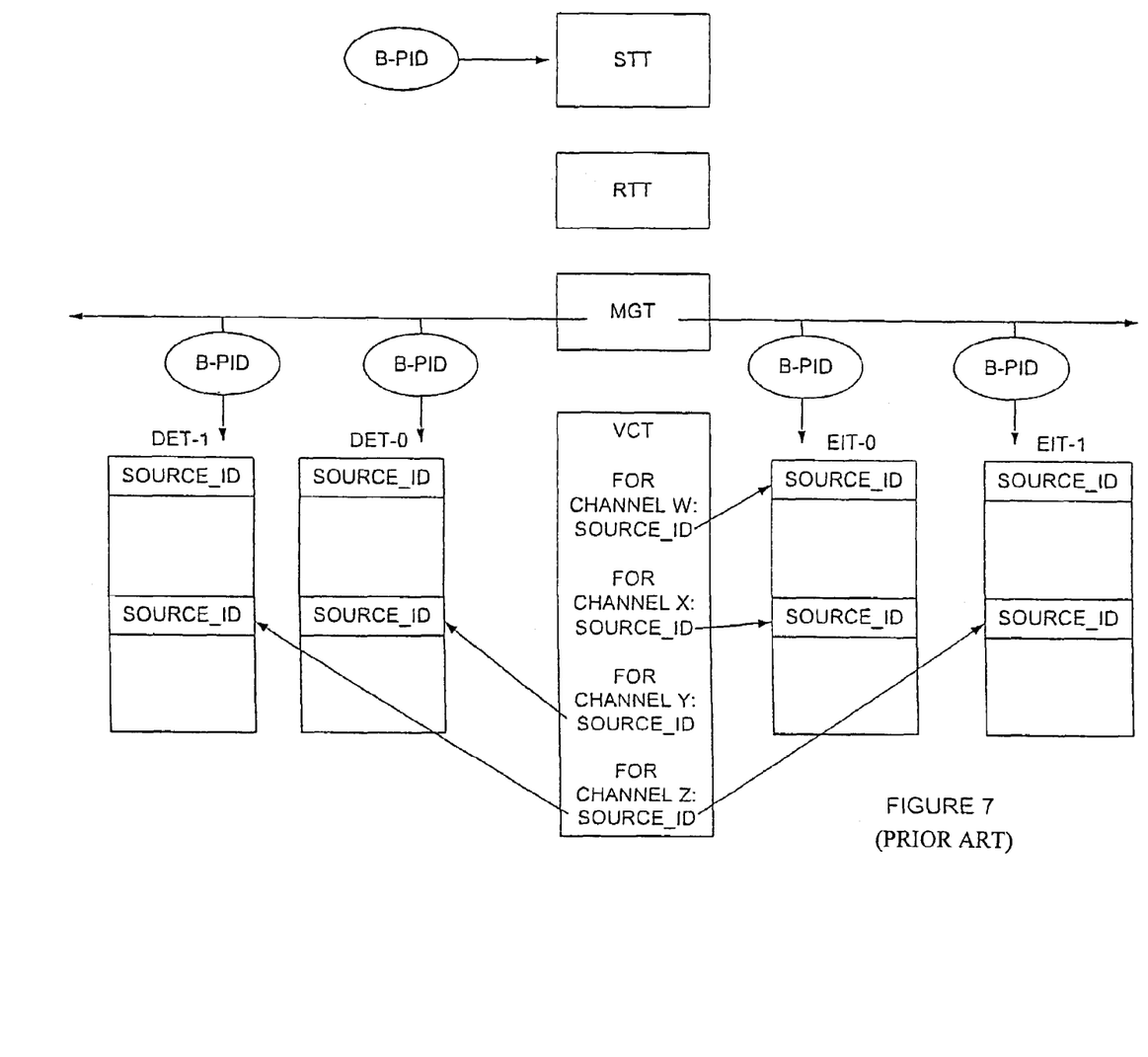
FIG. 7 depicts a table hierarchy of the PSIP data format in accordance with the present invention.

PSIP tables represent hierarchical structures, an example of which is illustrated in FIG. 7. Due to format incompatibility, the PSIP format must be converted into an XML format so as to render the PSIP data accessible through DOM2 API. The PSIP data structure follows the ATSC standard found in document A90, published Jul. 26, 2000, incorporated by reference herein. The data structure includes a System Time Table (STT) that serves as a time stamp table with trivial structure. The data structure further include a Master Guide Table (MGT) that serves as an index used for purposes of parsing the broadcast stream and enables the renderer to correctly extract all other tables. The data structure further includes a Virtual Channel Table (VCT) that serves as the main table used to define the various channels. Each row in the VCT corresponds to a single virtual channel, whose attributes are given in a corresponding virtual channel table. The collection of Event Information Tables (EIT) describe program events, such as movies, concerts, sporting events, television programs, etc. Each EIT points to the Virtual Channel which it is found in via the source_id attribute. The collection of Event Text Tables (ETT) introduce descriptions of the events in the EIT tables, and associates them via an event_id attribute.

Renderer 22 then provides the following conversion to make PSIP data accessible through DOM2 API within an XML format. This conversion first uses the Master Guide Table to identify each table location. For each table type, the renderer then defines an object class. The Renderer then parses the tables, and constructs and object instance for each parsed table. After the table has been parsed, the renderer then creates a new DOM root document object. Next, for each virtual channel, which is pointed by a row in the VCT table, the renderer adds the channel as a child of the root document. Next, for each EIT table, the renderer then adds each table as a child of the virtual child table having the same source id and then deletes the source_id attribute. Lastly, for each ETT table, the renderer then adds the ETT table as a child of EIT Event Information table having the same event_id, and then deletes both the source_id and the event_id attributes.

Figure 8:
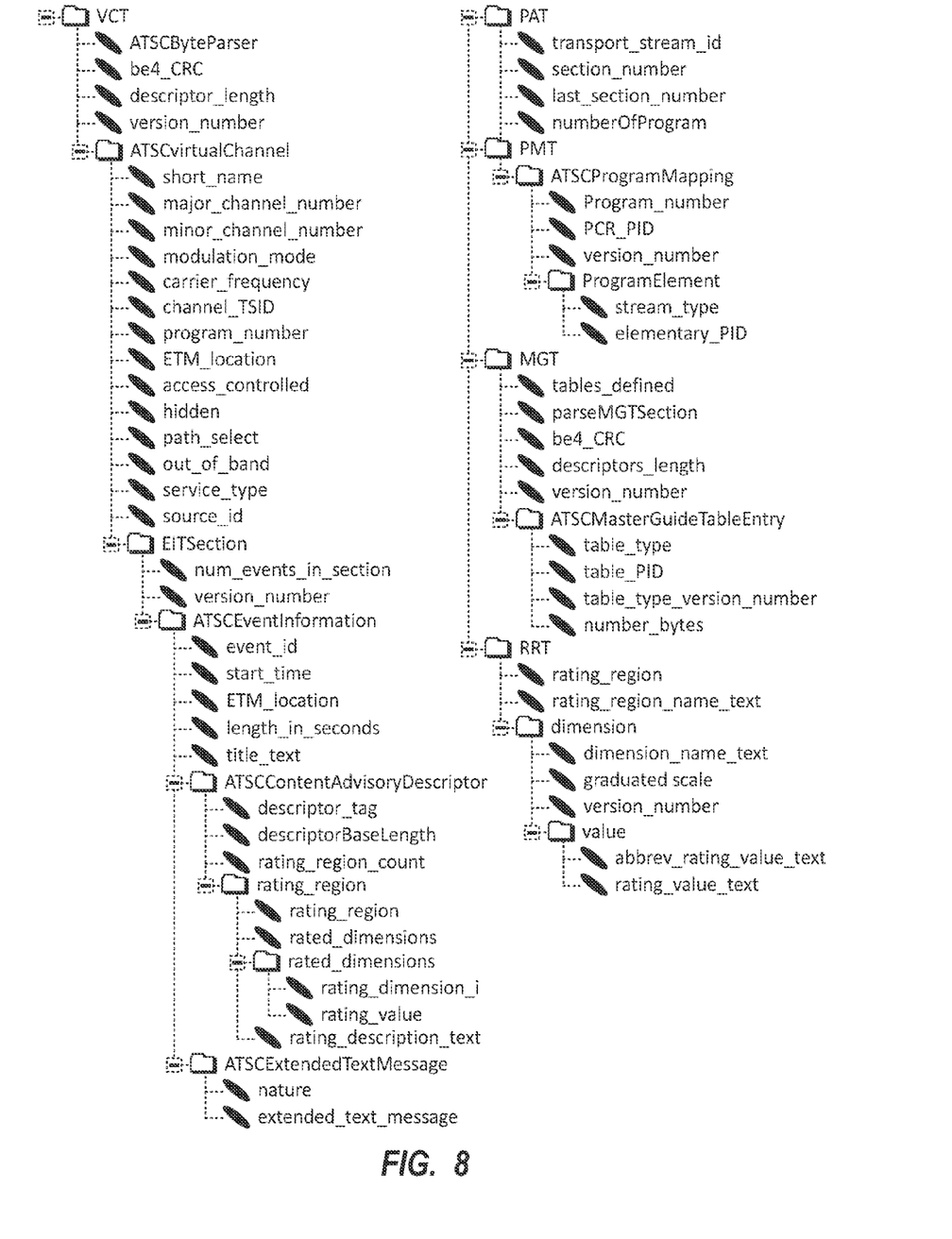
FIG. 8 illustrates a DOM tree and XML structure rendered by the present invention and used to represent the PSIP data within a content proxy.

FIG. 8 illustrates a DOM tree used by the content proxy to store the PSIP data. An EITSection is a collection of events, all of which are submitted in a single table and associated with a single virtual channel. The hierarchical mapping of EITSections and ATSCEventInformation objects is a key added value introduced according to the conversion method of the present invention. Instead of searching content by reference id, it is possible to find the information using a direct parent-child pointer, thus avoiding search and simplifying the API to render DOM2 compatibility. A sample PSIP XML database is shown in Appendix A.

Figure 9:
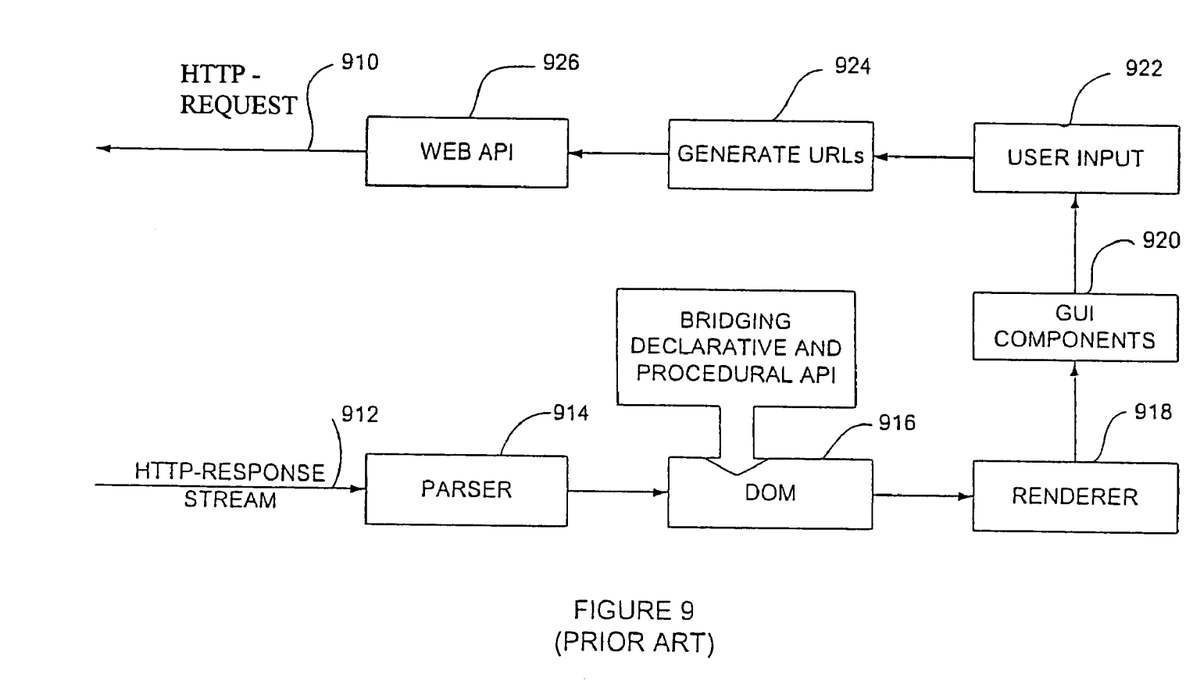
FIG. 9 depicts a web-page life cycle managed and rendered in accordance with processes known as Prior Art; and, FIG. 10 illustrates a broadcast life cycle rendered by the system of FIG. 2 according to the present invention.

To understand the implementation of the present invention, it is necessary to illustrate the operation of use of a DOM within a web-browser as found in the prior art. FIG. 9 illustrates such a use. Initially, as shown in step 910, an HTTP-Request initiates the life cycle for a particular web-page. Next, as shown in step 912, the HTTP-Response is received and converted into a data stream through a typical STB or set-top-box of the prior art. The STB, as shown in step 914, parses the stream and constructs a DOM data structure. Next, in step in 916, the renderer processes the DOM structure to produce the layout and the GUI components that make up the visible HTML page. The renderer action, as shown in block 918, and the GUI components, found in block 920, do not access the input data, but rather link to the DOM. Once the GUI is ready, the user or viewer can manipulate these components, as shown in block 922, by using either the mouse, the keyboard, or both, to generate user input. This input is either processed by the GUI components of block 920 or generates a new HTTP-Request, which is typically achieved by the selection of a link or by the typing or entering of a URL. In the event that a new link is selected, the system generates the new URL in block 924 after which the OS Web API of block 926 converts the URL into the appropriate HTTP-Request. Within the life cycle of the web-page, it starts as an HTTP-Request, and proceeds through a response stream, and then it is stored in a DOM structure before being rendered into GUI components. Once the GUI components are properly rendered, they are then send for display to the user.

Figure 10:
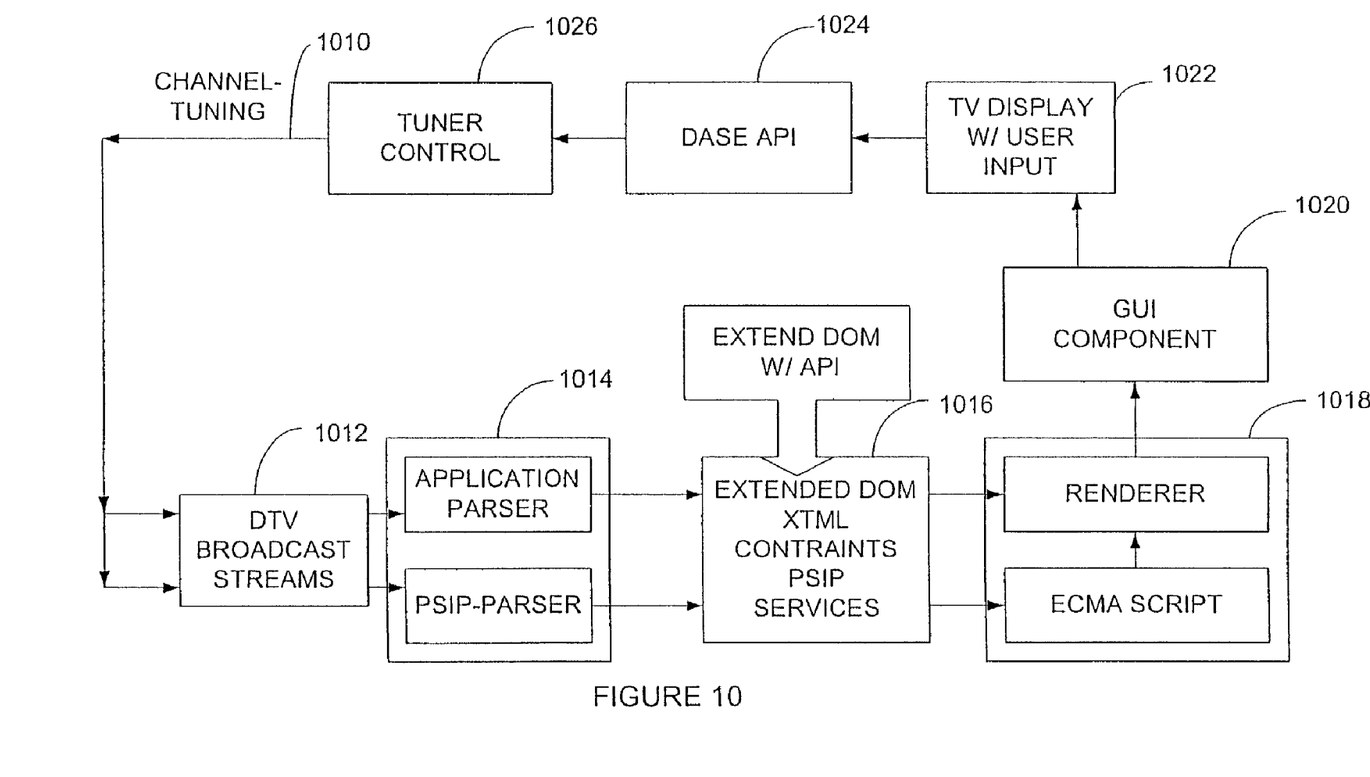

The implementation of the present invention is now illustrated by way of example in FIG. 10, which depicts the positioning of PSIP-DOM within a broadcast life cycle. When the renderer is initially turned on, in this case the renderer maybe a DTV or a set-top-box connected to the DTV, a default channel selection is performed as shown in step 1010. Based on the default channel selection the broadcast stream from the default channel is then received as shown in block 1012. As shown in block 1014, the stream is parsed by the content proxy and a DOM data structure is constructed. An application parserer works on the HTML, XML and other type languages found within the broadcast stream while the PSIP-parser works on the PSIP data, such as the MGT, VCT, EIT and others. Next, in block 1016, the renderer processes the DOM structure to produce the layout and the GUI components that make up the visible TV display. This includes generations of the extended DOM, HTML and XTML, various constraints, the PSIP data, and the Services Information. At this point, the method extends the DOM with the APIP, thereby eliminating the dependence on complex JAVATV APIP as was required in the prior art. Neither the renderer nor the GUI components access the stream directly, but rather link to the video, audio, and data service information stored in the content proxy DOM.

Next, in block 1018, the extended PSIP-DOM can then be either directly rendered into necessary GUI components of block 1020 or processed by the ECMAScript before being rendered into the appropriate GUI components. Each GUI component is mapped to at least one DOM object. Once the GUI components are readied, they are presented on the DTV display and remote-control events are collected, the user input as shown in block 1022. The collected events are either ignored, processed by the appropriate GUI components, processed by a DASE application, which may be declarative or procedural, or are used to control one or more tuners, which are channel switching or picture-in-picture type functions. Should a DASE application process one or more events, a DASE API as shown in block 1024, is utilized to control one or more tuners and to deliver the information service requested, whether it be through an Xlet or through ECMA-Script code. The ECMAScript code is the Digital TV parallel of web-page scripts. Thus, ECMA-Script and JavaScript are interchangeable for purposes of the present invention as their utility is the same.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of providing access to one or more services within a Digital TV Application Software Environment (DASE), the method comprising:
   receiving a transport stream having content and one or more applications, wherein the one or more applications provide the one or more services within the Digital TV Application Software Environment (DASE);
   using a renderer to interpret and prepare the content for rendering on a display device;
   mapping at least one XDML document to a Document Object Model (DOM) structure, the XDML document having at least one atomic element defined as a "tag" and the DOM having an atomic element defined as a "node;" and
   using a declarative application program interface to access Program System Information Protocol (PSIP) data, wherein the declarative application program interface comprises an XDML application program interface module that introduces new tags having semantics that enable HTML pages to perform an active dynamic discovery of at least one of (i) the content and (ii) the services, wherein the XDML application program interface module includes a rule structure for:
      defining a condition within the node;
      upon satisfaction of the condition, realizing an action defined by the at least one tag, which action is found within the PSIP data; and
      otherwise, realizing an action defined by the node.

2. The method according to claim 1 further comprising the step of rendering the XDML document based on the realized action.

3. The method according to claim 1 wherein the mapping step comprises identifying all tables via a master guide table.

4. The method according to claim 3 further comprising the steps of:
   defining an object class for each table identified;
   parsing each table;
   for each parsed table, constructing an object instance;
   generating a DOM root document object;
   adding a virtual channel as a child of the DOM root document object; and
   adding an event information table as a child of a virtual channel table based on source ID.

5. The method according to claim 1 further comprising the step of rendering the realized action for display on the display device.

6. The method according to claim 1 further comprising the step of automatically and dynamically updating all referenced actions.

7. A system that receives DASE-compatible broadcast streams containing video, audio, or data components, or any combination thereof, and renders the component(s) in a manner useful to an end user, the system comprising:
   a plurality of smart cards;
   PSIP data preserved within a PSIP database, in which service information pertaining to the plurality of smart cards is stored as well as further service information provided by the system independent of the services of the plurality of the smart cards; and
   a declarative application program interface configured to access the PSIP data, wherein the declarative application program interface comprises an XDML application program interface module that introduces new tags having semantics that enable HTML pages to perform an active dynamic discovery of at least one of (i) content and (ii) services of a transport stream, wherein a render is configured to interpret and prepare the content of the transport stream for rendering on an output device.

8. The system according to claim 7 wherein the system further includes means for mapping XDML declarative applications to a Document Object Model (DOM), which is used to enable JavaScript access to the PSIP database.

9. The system according to claim 7 wherein the new tags include associated unique identification values to access content.

10. The system according to claim 7 wherein the content can be generated based on user-inputs.

11. The system according to claim 7, wherein the services comprise at least one of:
    (i) an electronic program guide;
    (ii) a weather reports;
    (iii) a stock market report;
    (iv) television commerce;
    (v) a game;
    (vi) interactive advertising;
    (vii) interactive news
    (viii) an interactive TV show;
    (ix) an interactive sports broadcast;
    (x) TV-gaming;
    (xi) TV-auctioning;
    (xii) email; and
    (xiii) web-browsing.

12. The method according to claim 1, wherein the services comprise at least one of:
    (i) an electronic program guide;
    (ii) a weather reports;
    (iii) a stock market report;
    (iv) television commerce;
    (v) a game;
    (vi) interactive advertising;
    (vii) interactive news
    (viii) an interactive TV show;
    (ix) an interactive sports broadcast;
    (x) TV-gaming;
    (xi) TV-auctioning;
    (xii) email; and
    (xiii) web-browsing.

13. A method of providing access to one or more services within a Digital TV Application Software Environment (DASE), the method comprising:
    receiving a transport stream having content and one or more applications, wherein the one or more applications provide the one or more services within the Digital TV Application Software Environment (DASE);
    using a renderer to interpret and prepare the content for rendering on a display device; and
    using a declarative application program interface to access Program System Information Protocol (PSIP) data, wherein the declarative application program interface comprises an XDML application program interface module that introduces tags having semantics that enable performance of an active dynamic discovery of at least one of (i) the content and (ii) the services.

14. A method as recited in claim 13, wherein the XDML application program interface module includes a rule structure for:
- defining a condition within a node;
- upon satisfaction of the condition, realizing an action defined by a tag, wherein the action is found within the PSIP data; and
- otherwise, realizing an action defined by the node.

15. The method as recited in claim 14, further comprising the step of rendering the XDML document based on the realized action.

16. The method as recited in claim 14, further comprising the step of rendering the realized action for display on the display device.

17. The method as recited in claim 14, further comprising the step of automatically and dynamically updating all referenced actions.

18. The method as recited in claim 13, wherein the services comprise at least one of:
(i) an electronic program guide;
(ii) a weather reports;
(iii) a stock market report;
(iv) television commerce;
(v) a game;
(vi) interactive advertising;
(vii) interactive news
(viii) an interactive TV show;
(ix) an interactive sports broadcast;
(x) TV-gaming;
(xi) TV-auctioning;
(xii) email; and
(xiii) web-browsing.

* * * * *